(No Model.)
E. J. DAVY.
SCRAPER.
No. 508,685. Patented Nov. 14, 1893.
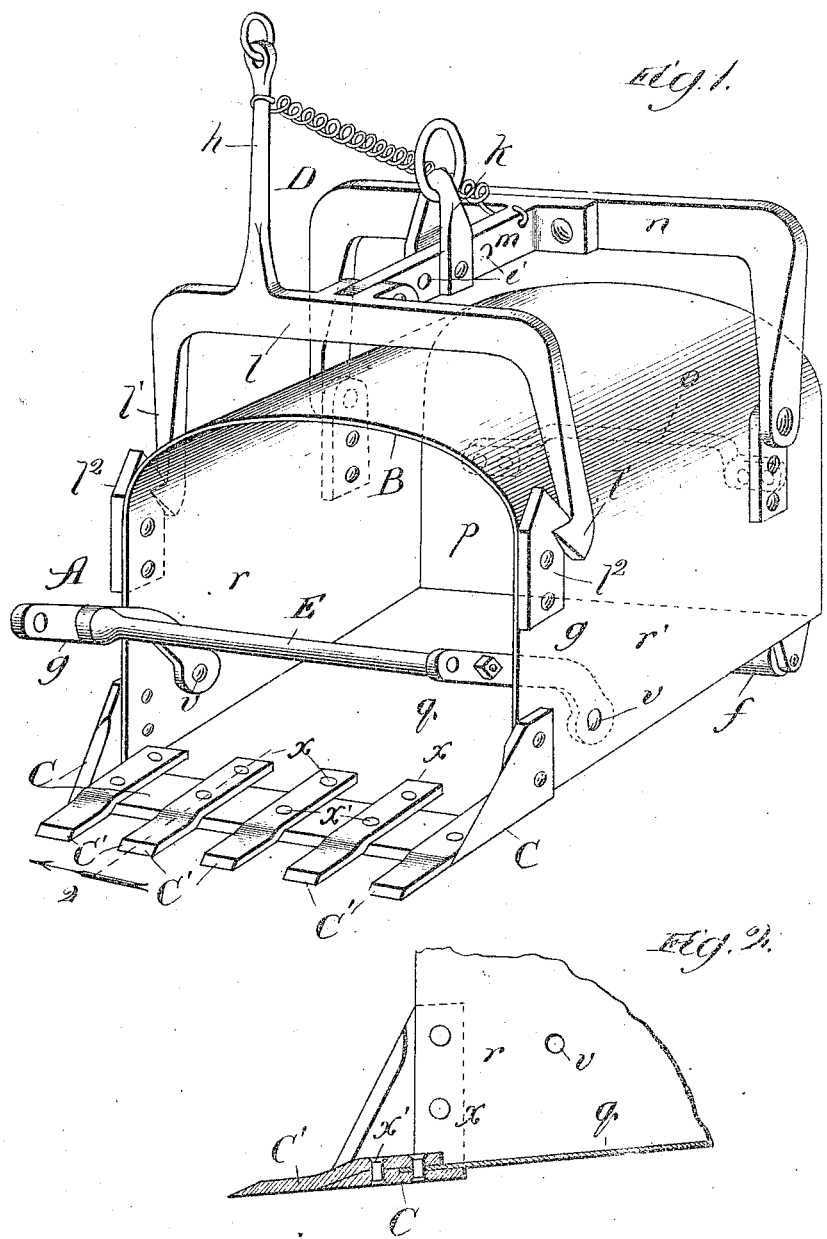

UNITED STATES PATENT OFFICE.

ERNEST J. DAVY, OF KENOSHA, WISCONSIN.

SCRAPER.

SPECIFICATION forming part of Letters Patent No. 508,685, dated November 14, 1893.

Application filed February 13, 1893. Serial No. 462,194. (No model.)

*To all whom it may concern:*

Be it known that I, ERNEST J. DAVY, a citizen of the United States, residing at Kenosha, in the county of Kenosha and State of Wisconsin, have invented a new and useful Improvement in Scrapers, of which the following is a specification.

My invention relates to an improvement in the kind of scrapers adapted for use, in excavating, with the class of excavating apparatus to which belongs that set forth in Letters Patent to William Davy, No. 478,254, dated July 5, 1892, for a sewer-excavating apparatus.

In the accompanying drawings, Figure 1 is a perspective view of my improved scraper; and Fig. 2 is a broken sectional view, showing a detail of construction, the section being taken at the line 2 on Fig. 1 and viewed in the direction of the arrow.

A is the body of the scraper, which is best formed, with the arched hood or cover B, of sheet-metal and preferably in one piece, bent to form the side $r$, hood or cover B, side $r'$ and flat base $q$, which may be joined along one edge to the adjacent edge of the side $r$. The front end of the scraper is open, while the rear end is closed, as by a back $p$, suitably fastened in place, and on which should be provided a handle $o$ for guiding purposes. On the front edge of the base is secured a cutter-plate C, sharpened along its forward edge to adapt it to cut the soil readily, and bent, toward its opposite ends, to right-angles to fit over the outer surfaces of the sides $r$ and $r'$, near the forward end of the scraper-body, at which points the cutter plate is secured, as by riveting. The intermediate portion of the cutter-plate C extends along the under surface of the base $q$, to which it is secured, also preferably by riveting, the rivets $x$ also serving to fasten in place the rear ends of teeth C', which are further riveted, as at $x'$, to the plate C. The teeth C' should be bent lengthwise to fit against the flush upper surfaces of the plate C and base $q$, and to extend at the bases of their forward end-portions, which project beyond the forward edge of the plate C, flush with the base of the latter, all as shown, whereby a firm support is afforded for the teeth, and they and the plate C form a smooth cutting medium for the soil to be loosened thereby prior to being crowded into the body A.

D is a combined hanger and latch device, comprising an approximately U-shaped bar $n$ extending transversely across the rear portion of the scraper-body, and pivotally connected, at its ends, with the sides $r$ and $r'$; a bar $m$ rigidly fastened at one end to the bar $n$ to extend forward therefrom lengthwise of the scraper-body, and to which a suitable hanger-loop $k$ should be adjustably fastened at one of the several openings $i$; and an approximately U-shaped bar $l$ pivotally connected near its center with the forward end of the bar $m$, and having hook-shaped extremities, whereby the depending arms of the bar form latches $l'$ to engage catches $l^2$ fastened in proper position to the outer surfaces of the sides $r$ and $r'$ of the scraper-body. From the bar $l$ I extend an arm $h$ at which to connect a rope, cable, or the like for tripping the latch as and for the purpose hereinafter described.

E is a spacer-bar, which extends between and holds apart the draft-arms $g$ pivotally fastened to the inner sides of the scraper-body; and I also provide on the rear end of the base $q$ a roller $f$ which serves, as one of its functions, to tip, slightly, the scraper toward its forward cutting edge, and, as another of its functions, to cause the scraper to ride the more easily on the surface of the ground. The roller $f$ is further advantageous in enabling the draft points $v$ on the scraper-body to be placed quite low thereon, thereby to afford a better draft, since it induces both the desirable slight forward tipping of the scraper and smooth riding of the base of the scraper on the ground.

To operate my improved scraper, the power (horse, or engine) is applied to the draft-arms $g$ through the medium of cable (not shown) fastened at one end to the eyes in the outer ends of the arms $g$, the scraper being suspended at its hanger on a suitable support. The draft actuates the scraper to first loosen the soil and fill it into the covered scraper-body, when the loaded suspended scraper is directed to a point at which its load is to be dumped. On reaching that point, a pull on the arm $h$ against its controlling spring $h'$ turns the bar $l$, to disengage the latches $l'$ from the catches $l^2$, whereupon the scraper-body, being supported only at its rear on the journal-ends of the bar $n$, tilts forward and discharges its contents, (the draft-cable having meantime been slackened.)

The covered scraper prevents loss of any portion of the load; and the construction, moreover, affords a simple, comparatively inexpensive, and reliably operative scraper for excavating purposes.

What I claim as new, and desire to secure by Letters Patent, is—

1. In a scraper, the combination with the body having a forward cutting edge, of a combined hanger and latch device D, comprising the bar $n$ pivoted to the opposite sides of the scraper-body to the rear of its transverse center, a bar $m$, at which the scraper is suspended, rigidly fastened at one end to the bar $n$ and extending forward therefrom, and a bar $l$ pivotally connected with the forward end of the bar $m$ and having latches $l'$, and catches $l^2$ on the sides of the body in position to be engaged by the said latches, substantially as described.

2. A scraper comprising, in combination, a body A formed of sheet-metal with a base $q$, sides $r$ and $r'$, a hood or cover B and a back $p$ provided with a suitable guide-handle, and provided on the forward edge of the base with a cutter-bar C carrying teeth C′, a roller $f$ on the base $q$, a draft-bar E extending between pivotal arms $g$ on the sides of the body, catches $l^2$ on the said sides, and a combined hanger and latch device D, comprising a bar $n$ pivoted to the opposite sides at the rear of the scraper-body, a bar $m$, at which the scraper is suspended, rigidly fastened at one end to the bar $n$ and extending forward therefrom, and a bar $l$ pivotally connected with the forward end of the bar $m$ and having latches $l'$ to engage the catches $l^2$ and provided with a trip-arm $h$, the whole being constructed and arranged to operate substantially as described.

ERNEST J. DAVY.

In presence of—
M. J. FROST,
W. N. WILLIAMS.